Patented Sept. 2, 1947

2,426,914

UNITED STATES PATENT OFFICE 2,426,914

PURIFICATION OF HYDROCHLORIC ACID

Walter S. Allen, Flushing, N. Y., assignor to General Chemical Company, New York, N. Y., a corporation of New York No Drawing. Application February 6, 1945, Serial No. 576,510

7 Claims. (Cl. 23—154)

This invention relates to manufacture of so-called chemically pure hydrochloric acid.

In production of "chemically pure" hydrochloric acid, a major problem encountered is the reduction of the arsenic impurity content. While chemically pure hydrochloric acid has been made directly from HCl gas produced by reaction of sulfuric acid and sodium chloride, the more common and well known method is by redistillation of commercial hydrochloric acid. In the distillation of the commercial acid, some impurities remain largely in the still bottoms, while free chlorine, $SO_2$ and arsenical impurities mostly pass over with the distillate and appear in the condensed product. It is known that, when distillation is carried out in the presence of free chlorine, the arsenic and $SO_2$ contents in the overhead of the still may be reduced considerably, and a good deal of the arsenic held back in the still bottoms. But in this situation, where distillation is effected in the presence of an appreciable excess of free chlorine, much of such free chlorine is carried over with the hydrochloric acid vapor. The presence of free chlorine in the product acid is substantially objectionable, and to meet this requirement it has been proposed to pass hydrochloric acid contaminated with free chlorine thru activated carbon. In this procedure, apparently acting as an adsorbent, the activated carbon collects the chlorine impurity, with the result that, as operation progresses, activity of the carbon continually decreases because of increased chlorine content, and frequent replacement of the activated carbon, a relatively expensive material, is required. Another deficiency is that, to operate to best advantage, this method requires the maintenance of the activated carbon at elevated temperatures within relatively narrow limits.

The major object of this invention lies in provision of a process for removing free chlorine from hydrochloric acid gas contaminated with this impurity.

It has been found that free chlorine contained in hydrochloric acid gas may be removed by catalytically reacting such chlorine with carbon monoxide in the presence of water vapor and at temperature not less than 350° F. It is thought that the overall removal of free chlorine is effected by reducing the free chlorine to hydrochloric acid and oxidizing the carbon monoxide to carbon dioxide in accordance with the equation, $CO + Cl_2 + H_2O \rightarrow CO_2 + 2HCl$.

Important operating factors of the instant process for removing free chlorine from hydrochloric acid gas containing the same are utilization of a suitable catalyst, the presence in the gas stream undergoing treatment of an adequate amount of CO and water vapor, and temperature conditions during the catalytic contacting operation of not less than 350° F.

One commercial utilization of the principles of the invention is in connection with the redistillation of commercial muriatic acid. Such principles are applicable whether the primary purpose of the operation is to remove free chlorine from a muriatic acid which already meets "chemically pure" trade requirements as to low arsenic content, or whether the object of redistillation is to lower the arsenic content of a commercial muriatic acid.

In the case of purification of aqueous hydrochloric acid which contains an objectionable amount of free chlorine but does not require treatment primarily for arsenic impurity reduction, such acid is run into a suitable vessel, distilled, and there is formed a gas-vapor mixture containing hydrochloric acid gas, free chlorine and water vapor. Aqueous hydrochloric acids include such an amount of water that the gas-vapor mixture formed by distillation always contains more water vapor than is needed to support catalytic reduction of free chlorine to HCl. Hence in usual practice, the gas-vapor mixture evolved by distillation of aqueous hydrochloric acid inherently contains more than enough water vapor needed in the present process.

The carbon monoxide employed may be from any suitable source, and may be relatively pure CO, or the CO of a gas mixture containing hydrogen and non-deleterious or inert diluents. The reducing material used may be introduced into the HCl gas-chlorine-water vapor mixture at any suitable point ahead of a chamber containing the catalytic material. The amount of reducing material should be at least sufficient to effect reduction of the free chlorine to HCl, although it is preferred to use a substantial excess. An excess of CO in the catalytic reducing zone may be maintained readily by supplying to the process such an amount of reducing agent that the tail gas of the final apparatus unit in which hydrochloric acid is condensed always has an appreciable CO content. To insure substantially complete removal of free chlorine, excesses of water vapor and reducing agent are needed, and one of the advantages of the instant process is that the presence of excesses of water vapor and reducing agents indicated does not require introduction of any reactants or reaction products which further contaminate the product, water being one of the necessary constituents of the final condensed product, and hydrogen, CO, and the $CO_2$ formed by oxidation of CO, all being insoluble in aqueous hydrochloric acid and removable from the system in the tail gas.

The catalysts employed are solid granular materials which are non-volatile at the temperature of operation and are free of iron and arsenic. It has been found that activated carbon, purified coke, purified wood charcoal, and silica gel effectively catalyze the free chlorine reduction reaction. Examples of commercial types of activated carbon which may be employed are "Norite" carbon and "Columbia" carbon. The granular forms of these carbons, as distinguished from the powdered forms are preferred, the common commercial size of about thru 3 on 14 mesh being particularly suitable. The coke may be such as that prepared by igniting metallurgical coke at a red heat in the absence of air, boiling with hydrochloric acid, washing and drying, the purpose of this treatment being to get rid of volatile matter, hydrogen sulfide and iron, all of which would contaminate the final product. Wood charcoal, if used, may be purified in the same manner. Granular commercial silica gel of sizes ranging about thru 8 on 20 mesh may be used. It has been found that these materials, when used under the hereindescribed conditions, function as catalysts, are not consumed, do not become contaminated, and do not require revivification or replacement.

Temperatures in the catalyst chamber are kept at not less than 350° F., and usually at 400° F. and higher. When using purified coke and wood charcoal, and silica gel as catalysts, better results are obtained when operating at temperatures of 425–450° F. While temperatures as high as 470° F. have been employed, higher temperatures afford no substantial operating advantage. Provided that the indicated minimum temperature is held in the catalyst chamber, temperatures may vary over a substantial range and need not be closely controlled. The stated temperatures may be maintained by any suitable means, e. g. external heating of the catalyst chamber, or by heat-exchange heating of incoming reducing agent, or both.

When, as is most often the case, the object of redistillation is to lower arsenic content, if the commercial muriatic acid to be treated does not contain as an impurity a sufficient quantity of free chlorine, redistillation of the crude acid is carried out in the presence of enough oxidizing agent to insure the presence of an excess of free chlorine in the still. Arsenical impurities are held back in the still bottoms evidently because free chlorine oxidizes arsenical impurities to less volatile form. While free chlorine itself may be introduced into the distillation operation, ordinarily the free chlorine is provided by adding to the impure acid prior to distillation a suitable amount of oxidizing agent such as alkali metal chlorates, permanganates and hydrogen peroxide. In any given operation, the amount of oxidizing agent should be enough to insure the presence of readily detectable free chlorine in the hydrochloric acid gas mixture generated by distillation. The reducing agent used is then added to the hydrochloric acid gas-free chlorine-water vapor mixture produced by the distillation step, and chlorine is catalytically removed as already described.

The principles of the invention may be utilized also in the manufacture of high grade hydrochloric acid by processes in which the product is made directly from hydrochloric acid gas formed by reaction of sulfuric acid and sodium chloride, which gas, because of the particular conditions of production, may contain free chlorine. In such an operation the hydrochloric acid gas leaving the sulfuric acid-sodium chloride reaction furnace may be passed first thru a bed of material such as suitably-sized coke to effect removal of entrained solid impurities and sulufric acid mist from the gas stream. Arsenical impurities may then be removed in any way known in the art, for example as shown in Adamson U. S. P. 1,936,078 of November 21, 1933. Usually such a gas stream contains more than enough water vapor to support the hereindisclosed catalytic removal of free chlorine. The reducing agent may be added to the gas stream at any suitable point, and thereafter practice of the invention is the same as described.

In the following three examples, the primary purpose of operation was to remove free chlorine from commercial muriatic acid, purification as to lowering of the arsenic content being secondary and incidental. The impure acids contained enough chlorine so that the gas-vapor mixture formed by distillation contained free chlorine.

*Example 1*

Crude muriatic acid, containing by weight 32% HCl, .017% free chlorine, and 0.00003% As, was continuously run into a still, and distilled at temperature of about 225° F. The hydrochloric acid gas-free chlorine-water vapor mixture was passed upwardly thru a 6-inch deep bed of thru 8 on 14 mesh "Norite," maintained by external heating at temperature of about 400° F. The mixture leaving the catalyst chamber was cooled to condense hydrochloric acid, and the nearly colorless product analyzed by weight 35% HCl, 0.0002% free chlorine, and 0.00000005% As. At the end of this run, covering a period of 2 hours, the activated carbon showed no appreciable weight loss. In a parallel operation, substantially pure carbon monoxide was introduced into the hydrochloric acid gas-free chlorine-water vapor mixture generated in the still, the amount of CO being such that the tail gas of the condenser in which hydrochloric acid was liquefied contained some CO. The condensed product obtained was water white, and analyzed by weight 35% HCl, 0.00000005% As, and no free chlorine. On completion of this run, covering a period of 2 hours, the activated carbon showed substantially no loss of weight and contained no appreciable amount of chlorine. There was no detectable consumption of activated carbon, thus indicating that its action is catalytic.

*Example 2*

Crude muriatic acid, containing by weight 32% HCl, 0.0016% free chlorine, and 0.00003% As, was run continuously into a still, and distilled at temperature of about 225° F. The hydrochloric acid gas-free chlorine-water vapor mixture was passed upwardly thru a 6 inch deep bed of thru 5 on 10 mesh metallurgical coke purified as previously described, maintained by external heating at temperature of 425–475° F. The mixture leaving the catalyst chamber was cooled to condense hydrochloric acid, and the slightly yellowish product analyzed by weight 35% HCl and 0.0002–0.0006% free chlorine. This run covered a period of 2 hours. In a similar operation, substantially pure carbon monoxide was introduced into the hydrochloric acid gas-free chlorine-water vapor mixture generated in the still, the amount of CO being such that the tail gas of the condenser in which hydrochloric acid was liquefied contained some CO. The condensed product analyzed by weight 35% HCl and less than 0.00000005% As, was water white and contained no trace of free chlorine. On completion of this run, covering a period of 1.5 hours, the coke showed no substantial weight loss and contained no appreciable amount of chlorine. There was no detectable coke consumption.

*Example 3*

The crude muriatic acid used contained by weight 32% HCl, 0.0018% free chlorine, and 0.0003% As. The impure acid was run continuously into a still, and distilled at temperature of about 225° F. The hydrochloric acid gas-free chlorine-water vapor mixture was passed upwardly thru a 6 inch deep bed of thru 10 on 20 mesh silica gel, maintained by external heating at temperature of 450–470° F. The mixture leaving the catalyst chamber was cooled to condense hydrochloric acid, and the yellowish product analyzed by weight 35% HCl and 0.001% free chlorine. This run covered a period of 1 hour. In a similar operation, substantially pure carbon monoxide was introduced into the hydrochloric acid gas-free chlorine-water vapor mixture generated in the still, the amount of CO being such that the tail gas of the condenser in which hydrochloric acid was liquefied contained some CO. The condensed product was water white, and contained by weight 35% HCl and no trace of free chlorine. On completion of this run, covering a period of 1 hour, the silica gel contained no appreciable amount of chlorine.

In the following examples, chief object of operation was to reduce the arsenical impurity content of crude muriatic acid which did not contain, as an impurity sufficient free chlorine to effect arsenical impurity content reduction in the distillation step.

*Example 4*

The crude muriatic acid used contained by weight 32% HCl, 0.00003% As and no free chlorine. To this material, there was added enough $KClO_3$ to give a free chlorine content of 0.018%. The liquor was run continuously into a still and distilled at temperature of about 225° F. The hydrochloric acid-water vapor mixture containing some free chlorine was passed upwardly thru a 6 inch deep bed of thru 8 on 14 mesh "Norite" carbon maintained by external heating at temperature of about 400° F. The mixture leaving the catalyst chamber was cooled to condense hydrochloric acid and the slightly colored product analyzed by weight 35% HCl, 0.0002% free chlorine and 0.00000005% As. This run covered a period of 3 hours. In a similar operation, substantially pure carbon monoxide was introduced into the hydrochloric acid gas-free chlorine-water vapor mixture generated in the still, the amount of CO being such that the total gas of the condenser in which hydrochloric acid was liquefied contained some CO. The condensed product obtained was water white, and contained by weight 35% HCl, and 0.00000005% As, and no free chlorine. On completion of this run, covering a period of 2 hours, the "Norite" showed no substantial weight loss and contained no appreciable amount of chlorine.

*Example 5*

The crude muriatic acid used contained by weight 32% HCl, 0.00003% As and no free chlorine. To this material, there was added enough $KClO_3$ to give a chlorine content of 0.0016%. The liquor was run continuously into a still and distilled at temperature of about 225° F. The hydrochloric acid-water vapor mixture containing some free chlorine was passed upwardly thru a 6 inch deep bed of thru 5 on 10 mesh purified coke maintained by external heating at temperature of about 450° F. The mixture leaving the catalyst chamber was cooled to condense hydrochloric acid and the yellow colored product analyzed by weight 35% HCl, 0.00005% free chlorine and 0.00000005% As. The run covered 2.5 hours. In a similar operation, substantially pure carbon monoxide was introduced into the hydrochloric acid gas-free chlorine-water vapor mixture generated in the still, the amount of CO being such that the total gas of the condenser in which hydrochloric acid was liquefied contained some CO. The condensed product obtained was water white, and contained by weight 35% HCl, and 0.00000005% As, and no free chlorine. On completion of this run, covering a period of 1.5 hours, the coke showed no substantial weight loss and contained no appreciable amount of chlorine.

I claim:

1. In the process of purifying hydrochloric acid gas containing free chlorine as an impurity, the step comprising catalytically reacting said chlorine with carbon monoxide in the presence of water vapor whereby said chlorine is reduced to HCl.

2. The process of purifying hydrochloric acid gas containing free chlorine as an impurity which comprises passing said gas, together with water vapor and carbon monoxide, in contact with a catalyst of the group consisting of activated carbon, coke, wood charcoal and silica gel, and maintaining temperature not less than 350° F. during said contacting operation.

3. The process of purifying hydrochloric acid gas containing free chlorine as an impurity which comprises passing said gas, together with water vapor and carbon monoxide, in contact with a catalyst of the group consisting of activated carbon, coke, wood charcoal and silica gel, and maintaining temperature not less than 350° F. during said contacting operation, the amount of water vapor and reducing agent being in excess of that required to effect reduction of said free chlorine to HCl.

4. The process of purifying hydrochloric acid gas containing free chlorine as an impurity which comprises passing said gas, together with carbon monoxide and water vapor, in contact with activated carbon while maintaining temperature not less than 350° F., the amount of carbon monoxide and water vapor being at least sufficient to effect reduction of said free chlorine to HCl.

5. In the process of purifying aqueous hydrochloric acid containing arsenical impurity by procedure including distilling said acid in the presence of an oxidizing agent under conditions to form a gas-vapor mixture containing hydrochloric acid gas, water vapor and free chlorine, the improvement comprising passing said mixture, together with carbon monoxide, in contact with a catalyst of the group consisting of activated carbon, coke, wood charcoal and silica gel, and maintaining temperature not less than 400° F. during said contacting operation, the amount of reducing agent being in excess of that required to effect reduction of said free chlorine to HCl.

6. In the process of purifying hydrochloric acid gas containing free chlorine as an impurity, the step comprising reacting said chlorine with carbon monoxide in the presence of water vapor and at temperature not less than 350° F., whereby said chlorine is reduced to HCl.

7. In the process of purifying aqueous hydrochloric acid containing arsenical impurity by procedure including distilling said acid in the presence of an oxidizing agent under condtions to form a gas-vapor mixture containing hydrochloric acid gas, water vapor and free chlorine, the improvement comprising catalytically reacting said free chlorine with carbon monoxide in the presence of said water vapor at temperature not less than 350° F.

WALTER S. ALLEN.

REFERENCES CITED

The following references are of record in the file of this patent:

UNITED STATES PATENTS

| Number | Name | Date |
|---|---|---|
| 2,213,544 | Brown | Sept. 3, 1940 |
| 1,220,411 | Garner et al. | Mar. 27, 1917 |